Oct. 3, 1967     F. B. OLENDER ET AL     3,345,115

BACK SEAL FOR IDLER ROLLERS

Filed Oct. 27, 1964

INVENTOR.
F. B. OLENDER
G. A. WARD
BY John L. Shortley
ATTORNEY.

United States Patent Office 3,345,115
Patented Oct. 3, 1967

3,345,115
BACK SEAL FOR IDLER ROLLERS
Francis B. Olender, Wallington, and George A. Ward, Clifton, N.J., assignors, by mesne assignments, to Hewitt-Robins, Incorporated, Stamford, Conn., a corporation of Delaware
Filed Oct. 27, 1964, Ser. No. 406,794
1 Claim. (Cl. 308—20)

This invention relates to grease seals for belt conveyor idler rollers. A seal according to this invention is particularly useful for rollers used as wing or side rollers in troughing idlers. Many side rollers of troughing idlers are now disposed at substantial angles with respect to a horizontal plane. Many are being placed at angles of 45°.

These "higher" angles entail greater risk that grease seals inboard of the outermost bearing of the high angle rollers will fail. Upon failure of such a seal the grease in the outer bearing will migrate down the interior of the roller away from the bearings. This will soon cause excessive wear and may well even result in seizure of the bearing. The life of rollers thus affected will be less than what has been normal expected life heretofore.

Idler rollers are normally expected to have a long life—15 years or more. However, as is apparent, an idler cannot remain in service very long after a bearing has failed. Failure of the bearing can not only cause increased service and maintenance expense, it can also cause belt wear, training difficulties, and load spillage problems, as well as create fire hazards due to over-heating.

An object of this invention is to provide a grease seal which will prevent migration of grease inwardly of a rotating member and away from bearings tilted on their rolling axis to an angle similar to that of an outboard idler roller bearing in a troughing idler at a "high" angle, such as 45°.

A further object is to provide a seal which will remain effective for periods of use comparable with that the conveyor industry generally expects for bulk material conveyor idlers; i.e., for periods of as much as 15 years of steady usage. Steady usage would result, for example, in a service comparable with the peripheral movement of an idler surface while the belt is loaded for a distance equal to that of a trip to the moon and back in the 15-year period.

Bearing seals for idler rollers or similar usage must also be capable of withstanding the forces applied to them during greasing of the idlers. Often substantial pressures are applied in forcing grease into idler roller bearings in the field. This can result in harm to the seals. One additional object of this invention is accordingly to provide a seal as above described which will not fail or "blow out" due to relatively high pressure applied to it during greasing. By relatively high is meant a pressure which is above that which is customarily recommended for use with bearings of the type which are employed in idler rollers as set forth in manufacturers' catalogs for many years.

While the invention was conceived as an adjunct to troughing conveyor idler rollers, it is not intended to be so limited and it is therefore a further object of the invention to provide an improved grease seal wherever suitable.

The above and other features, objects and advantages of the present invention will be fully understood from the following description considered in connection with the accompanying illustrative drawing.

FIGURE 1 of the accompanying drawing is an elevational, partly sectional view of the head or high end of an idler roller for conveyors having a grease seal according to the invention.

Figure 1:
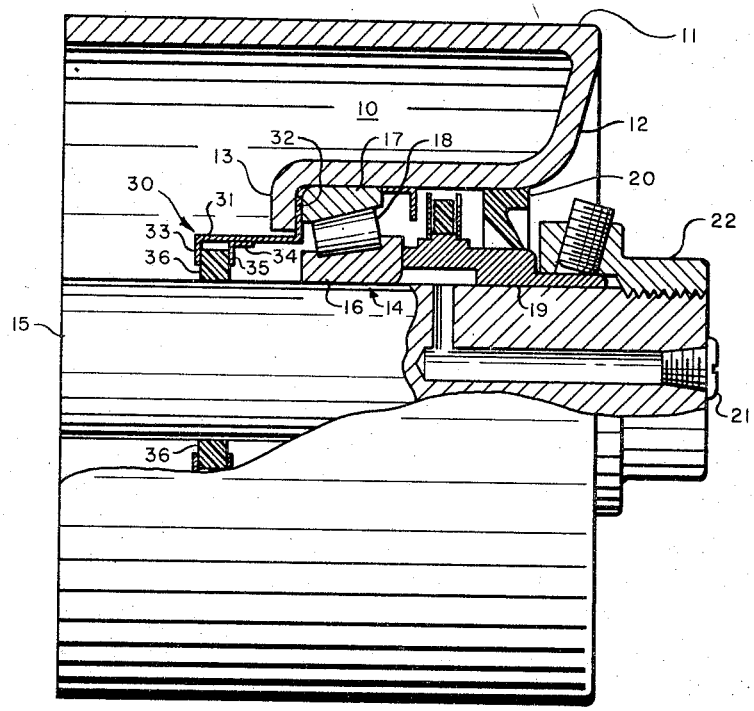
Figure 3:
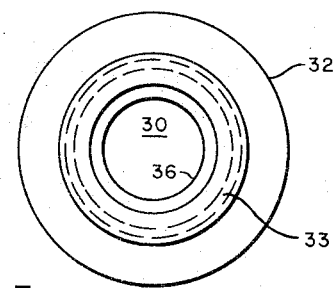
FIGURE 3 is an end view of the grease seal illustrated in FIGURE 2.

As shown in FIGURE 1, roller 10, usually made of steel, comprises a cylinder body 11 having a re-entrant portion 12. Seated against an inwardly directed skirt 13 of the re-entrant portion is a suitable roller bearing assembly 14 including an inner race 16 mounted on the roller shaft 15 and an outer race 17 between which a series of spaced rollers 18 are positioned as is well known.

A conventional outer grease seal arrangement 19, dust seal 20, a grease fitting 21 and an adjustable collar 22 are also provided.

Figure 2:
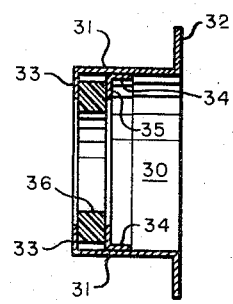
FIGURE 2 is an elevational cross-sectional view of a grease seal per se according to the invention.
Figure 4:
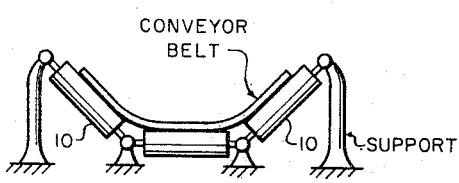
FIGURE 4 is a view on a reduced scale showing a troughing idler embodying rollers having seals according to the instant invention.

Referring to FIGURE 1 and in particular, FIGURE 2, the improved sealing construction according to the invention is generally designated 30. In its presently preferred form, the grease seal 30 consists of an outer annular shell 31 of sheet steel. The outer shell 31 is provided with a radially outwardly directed flange 32, at one end, which provides a convenient means for fixing the grease seal 30. The flange 32 is thus clamped between the outer race 17 and skirt 13 of the roller body. A radially inwardly directed flange 33 is provided at the other end of shell 31. An inner shell 34, in the form of an annularly extended angle is secured to the outer shell by a press fit, with the free flange 35 in spaced, substantially parallel relationship with the flange 33 of the outer shell 30. The annular shell recess thus formed receives a ring 36 of a linear polyamide resin; i.e., nylon.

The recess in the shell is larger than the ring in both width and diameter. This insures that the ring rotates within the recess and also facilitates assembly on the shaft. In the preferred form illustrated, in which nylon is used, the width of the shell recess is $\frac{1}{32}''$ greater than the thickness of the ring. The diameter of the recess is, on the other hand, $\frac{1}{8}''$ greater than the outside diameter of the ring.

The inner edges of the flanges 33 and 35 are spaced from the roller shaft 15 a distance greater than $\frac{1}{16}''$ to allow the seal to facilitate placement of the seal on the shaft. Flanges 33 and 35 are, however, made long enough to provide sufficient surface area overlying the side faces of the ring 36 to hold it in place against the pressure applied when the bearing is greased. The ring has an inner diameter slightly larger than the shaft; i.e., a designed allowance of .03 inch is provided. Thus although the ring will normally prevent grease leakage, air and grease, under high pressure, can escape from the bearing chamber without damaging the inner seal. The clearance is of such an amount that grease under normal running pressures will not migrate down the shaft.

Again, referring to FIGURE 1, it is also noteworthy that the inboard grease seal 30 is quickly and easily secured in place on a roller of the type illustrated or other types of known conveyor idler rollers, and other apparatus with which the invention is useful. This is accomplished by the provision of the flange 32, on the outer shell, which is clamped between the outer race 17 of the bearing and a shoulder on the skirt 13.

It will be apparent to those skilled in the art that the above described invention will provide a simple inboard grease seal which is quickly and easily secured in place, which will resist the forces imposed on it when the bearing is being charged or packed with grease and will prevent migration of grease along the inclined shaft, whereby the bearing and roller will be lubricated for extended periods of operation. The grease seal described is simple and inexpensive to manufacture and economically adapted to presently known idler roller construction without requiring special modifications, tools, or skilled mechanics. It will likewise be apparent that the inboard grease seal according to the invention, will have at least as long a life as the known or conventional outboard grease seals. Additionally, the grease seal ring 36 can be placed on the shaft 15 without particular caution since the ring will radially align or center itself due to relationship between the ring and the flanges 33 and 35, and the inner periphery of the shell recess.

While I have shown and described the presently preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention embodied within the appended claim.

What is claimed is:

An idler roller for troughing conveyors comprising a roller body member, a shaft having a ring member secured thereto, a roller bearing adjacent one end of said body member and the corresponding end of said shaft for rotatably supporting said body member on said shaft, means for supplying grease to said bearing, grease and dust seal means outboard of said bearing; a hollow sheet metal cylindrical member having a radially inwardly directed flange on one end and a radially outwardly extending flange on the other end, said outwardly extending flange being secured between said roller body and said bearing for supporting and positioning said cylindrical member in spaced substantially concentric relation with said shaft, an annular shell member having a flange extending inwardly and substantially parallel with the radially inwardly directed flange of said cylindrical member, said annular shell member having a press fitting relation within said cylindrical member and defining a recess with the inwardly extending flange of said cylindrical member for loosely receiving said ring member, said recess having an inside diameter greater than the outside diameter of said ring member permitting said ring member to move relative to said cylindrical member in order to thereby permit said ring member to remain secured around said shaft when said cylindrical member is slightly out of alignment with said shaft, said ring member and the flanges defining said recess being adapted and arranged to define an inboard grease seal for said idler roller.

References Cited

UNITED STATES PATENTS

| | | | |
|---|---|---|---|
| 958,193 | 5/1910 | Thebaud | 308—36.1 |
| 1,655,335 | 1/1928 | Pfleegor | 308—20 |
| 1,734,266 | 11/1929 | Moorhouse | 308—187.1 |
| 1,801,655 | 4/1931 | Brown | 308—187.2 |
| 1,958,412 | 5/1934 | Andrada et al. | 308—20 X |
| 2,759,777 | 8/1956 | Anderson | 308—187.1 |

MARTIN P. SCHWADRON, *Primary Examiner.*

I. C. COHEN, *Assistant Examiner.*